US012530201B2

(12) United States Patent
Uehara

(10) Patent No.: US 12,530,201 B2
(45) Date of Patent: Jan. 20, 2026

(54) REBOOTING SYSTEM FOR AN IMAGE PROCESSING APPARATUS PERIPHERAL THAT EXTENDS A TIMER FOR REBOOTING TO PERFORM PROCESSING FOR A COMMUNICATION ERROR BETWEEN OPERATION PANEL AND MAIN BODY

(71) Applicant: Noriyuki Uehara, Kanagawa (JP)

(72) Inventor: Noriyuki Uehara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 48 days.

(21) Appl. No.: 18/690,036

(22) PCT Filed: Oct. 25, 2022

(86) PCT No.: PCT/IB2022/060220
§ 371 (c)(1),
(2) Date: Mar. 7, 2024

(87) PCT Pub. No.: WO2023/094912
PCT Pub. Date: Jun. 1, 2023

(65) Prior Publication Data
US 2024/0427609 A1 Dec. 26, 2024

(30) Foreign Application Priority Data
Nov. 24, 2021 (JP) ................. 2021-190308

(51) Int. Cl.
*G06F 1/26* (2006.01)
*G06F 9/4401* (2018.01)
*G06F 1/3234* (2019.01)

(52) U.S. Cl.
CPC ............ *G06F 9/4401* (2013.01); *G06F 1/263* (2013.01); *G06F 1/3284* (2013.01)

(58) Field of Classification Search
None
See application file for complete search history.

(56) References Cited

U.S. PATENT DOCUMENTS

| 5,511,204 A * | 4/1996 | Crump ..................... G06F 1/30 713/321 |
| 2006/0206741 A1* | 9/2006 | Allison ................... G06F 1/266 713/340 |

(Continued)

FOREIGN PATENT DOCUMENTS

| EP | 780000 A1 | 6/1997 |
| JP | 2017-107526 A | 6/2017 |

(Continued)

OTHER PUBLICATIONS

International Search Report and Written Opinion issued on Feb. 3, 2023 in PCT/IB2022/060220 filed on Oct. 25, 2022.

*Primary Examiner* — Danny Chan
(74) *Attorney, Agent, or Firm* — Harness, Dickey & Pierce, P.L.C.

(57) ABSTRACT

A rebooting system includes: a processing apparatus configured to perform processing; and an operation panel configured to receive an operation on the processing apparatus. The processing apparatus includes first power supply control circuitry that controls power supply in the processing apparatus, a timer, first circuitry including a first kernel, and a first communication interface that communicates a signal with the operation panel. The operation panel includes second power supply control circuitry that controls power supply in the operation panel, and a second communication interface that communicates a signal with the processing apparatus. In response to receipt of a signal indicating a communication error between the operation panel and the processing apparatus, the first power supply control circuitry starts the timer and notifies the first kernel of the commu- (Continued)

nication error. The first kernel requests the timer to extend a time, based on a time to be taken for processing performed by the processing apparatus. In response to receipt of a signal indicating power-off from the second power supply control circuitry, the first power supply control circuitry powers off the processing apparatus to start rebooting.

14 Claims, 4 Drawing Sheets

(56) References Cited

U.S. PATENT DOCUMENTS

| | | | |
|---|---|---|---|
| 2013/0198537 A1* | 8/2013 | Uehara | G06F 1/30 |
| | | | 713/300 |
| 2014/0071479 A1 | 3/2014 | Hikichi | |
| 2015/0338898 A1* | 11/2015 | Yoshida | B41J 29/38 |
| | | | 713/323 |
| 2017/0149990 A1* | 5/2017 | Saito | H04N 1/00411 |
| 2017/0153898 A1 | 6/2017 | Hayashi | |
| 2017/0201641 A1 | 7/2017 | Uehara | |
| 2018/0152579 A1 | 5/2018 | Iwasa | |
| 2018/0181386 A1 | 6/2018 | Uehara | |
| 2021/0297549 A1 | 9/2021 | Hikichi | |

FOREIGN PATENT DOCUMENTS

| | | |
|---|---|---|
| JP | 2017105163 A | 6/2017 |
| JP | 2018092593 A | 6/2018 |
| JP | 2021-149436 A | 9/2021 |

\* cited by examiner

REBOOTING SYSTEM FOR AN IMAGE PROCESSING APPARATUS PERIPHERAL THAT EXTENDS A TIMER FOR REBOOTING TO PERFORM PROCESSING FOR A COMMUNICATION ERROR BETWEEN OPERATION PANEL AND MAIN BODY

CROSS-REFERENCE TO RELATED APPLICATIONS

This application is a national phase entry under 35 U.S.C. § 371 of PCT International Application No. PCT/IB2022/060220 which has an International filing date of Oct. 25, 2022, which claims priority to Japanese Application No. 2021-190308, filed Nov. 24, 2021, the entire contents of each of which are hereby incorporated by reference.

TECHNICAL FIELD

The present disclosure relates a rebooting system, a rebooting method, and a recording medium.

BACKGROUND ART

In the related art, power supply is stopped in response to occurrence of a communication failure between an operation panel and a main body of a device.

A technique for automatically stopping power supply in response to occurrence of a communication failure between an operation panel and a main body of a device to reboot the device is disclosed (see PTL 1).

CITATION LIST

Patent Literature

PTL 1
Japanese Unexamined Patent Application Publication No. 2017-105163

SUMMARY OF INVENTION

Technical Problem

According to the rebooting method of the related art, however, power supply may be stopped before a log of an abnormality that has occurred is stored or while a hard disk drive (HDD) is being accessed. In such a case, a disadvantage such as the absence of the log or the failed HDD occurs.

Solution to Problem

According to an aspect of the present disclosure, a rebooting system is provided that includes a processing apparatus that performs processing, and an operation panel that receives an operation on the processing apparatus. The processing apparatus includes first power supply control circuitry that controls power supply in the processing apparatus, a timer, first circuitry including a first kernel, and a first communication interface that communicates a signal with the operation panel. The operation panel includes second power supply control circuitry that controls power supply in the operation panel, and a second communication interface that communicates a signal with the processing apparatus. In response to receipt of a signal indicating a communication error between the operation panel and the processing apparatus, the first power supply control circuitry starts the timer and notifies the first kernel of the communication error. The first kernel requests the timer to extend a time, based on a time to be taken for processing performed by the processing apparatus. In response to receipt of a signal indicating power-off from the second power supply control circuitry, the first power supply control circuitry powers off the processing apparatus to start rebooting.

According to another aspect of the present disclosure, a rebooting method is provided that is carried out by a system including a processing apparatus that includes a timer, a first kernel, and first power supply control circuitry and performs processing, and an operation panel that includes second power supply control circuitry and receives an operation on the processing apparatus. The rebooting method includes in the first power supply control circuitry, starting the timer in response to receipt of a signal indicating a communication error between the operation panel and the processing apparatus; in the first kernel, requesting the timer to extend a time, based on a time to be taken for processing performed by the processing apparatus; and in the first power supply control circuitry, powering off the processing apparatus to start rebooting, in response to receipt of a signal indicating power-off from the second power supply control circuitry.

Advantageous Effects of Invention

According to the aspects of the present disclosure, an advantageous effect is attained such that an additional time for processing to be performed before power supply is stopped is successfully ensured at the time of a communication failure.

BRIEF DESCRIPTION OF DRAWINGS

A more complete appreciation of embodiments of the present disclosure and many of the attendant advantages and features thereof can be readily obtained and understood from the following detailed description with reference to the accompanying drawings.

Figure 1:
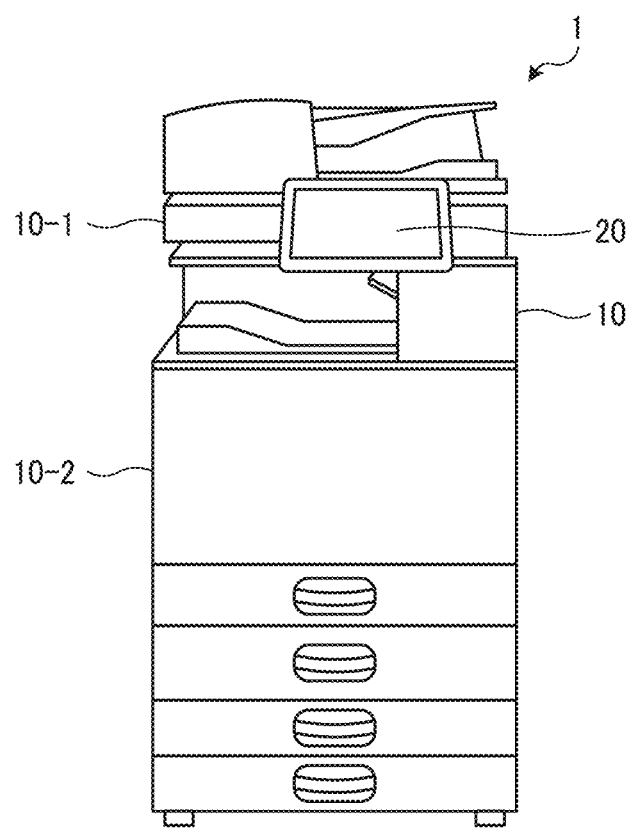
FIG. 1 is an external view of a multifunction peripheral (MFP) which is an example of a rebooting system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A rebooting system, a rebooting method, and a rebooting program according to an embodiment of the present disclosure will be described in detail below with reference to the accompanying drawings. A description is given of an example of the rebooting system that is applied to an MFP. However, a target to which the rebooting system is applied is not limited to the MFP and may be any system that performs rebooting.

Embodiment

FIG. 1 is an external view of an MFP which is an example of a "rebooting system" according to an embodiment of the present disclosure. An MFP is an apparatus having two or more different functions among a plurality of functions such as a copy function, a scan function, a print function, and a facsimile function.

An MFP 1 to which the rebooting system is applied includes a main body 10 and an operation panel 20. The main body 10 includes an image processing unit 10-1 and an image forming unit 10-2 and performs image processing such as scanning, copying, and printing. The image processing unit 10-1 includes a scanner that scans an original, and an image processing board that processes a resultant scanned image. The image forming unit 10-2 includes an image former that forms an image such as the scanned image on a sheet in accordance with an electrophotography or inkjet method, for example, and a sheet feeder that feeds a sheet. In this embodiment, the main body 10 may be referred to as a processing apparatus.

The operation panel 20 is a user interface with which a user operates the main body 10 which is an operation target. The main body 10 performs wired or wireless communication with the operation panel 20. The main body 10 and the operation panel 20 are coupled to each other by a dedicated coupling cable 30 (see FIG. 2). The main body 10 and the operation panel 20 respectively notify the operation panel 20 and the main body 10 of states of the main body 10 and the operation panel 20 by mutual communication of signals such as ON and OFF signals through the coupling cable 30. For example, an ON signal is a high-level signal and an OFF signal is a low-level signal.

The operation panel 20 receives an operation and a setting from the user via an operation screen, and sends information indicating the operation and the setting to the main body 10 via a wireless or wired communication interface (I/F).

Examples of the setting received via the operation screen include a parameter for image formation, a scan resolution, a setting value of a job, a toner concentration for printing, a printing setting such as color printing, a rebooting setting, and a log information acquisition method.

Hardware Configuration

Figure 2:
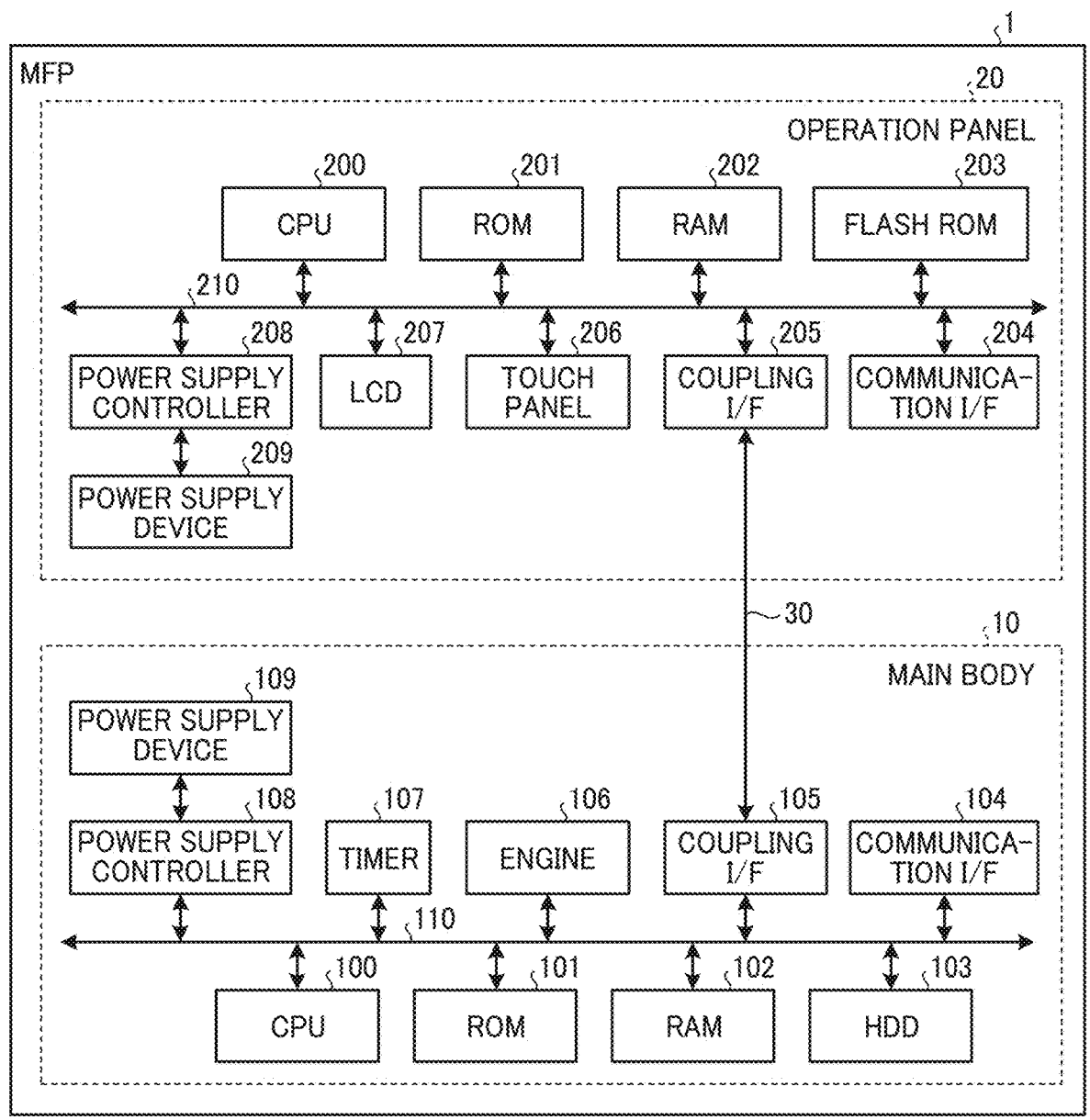
FIG. 2 is a diagram illustrating an example of a hardware configuration of the MFP.

FIG. 2 is a diagram illustrating an example of a hardware configuration of the MFP 1. As illustrated in FIG. 2, each of the main body 10 and the operation panel 20 includes a central processing unit (CPU), a read-only memory (ROM), and a random access memory (RAM) and executes a corresponding control program to operate in accordance with an independent operating system (OS).

The main body 10 includes a CPU 100, a ROM 101, a RAM 102, an HDD 103, a communication I/F 104, a coupling I/F 105, an engine 106, a timer 107, and a power supply controller 108.

The CPU 100, the ROM 101, the RAM 102, the HDD 103, the communication I/F 104, the coupling I/F 105, the engine 106, the timer 107, and the power supply controller 108 are coupled to one another through a bus 110.

The CPU 100 reads control programs stored in the ROM 101 or the HDD 103 to the RAM 102 and executes each of the control programs as appropriate. The CPU 100 is a main CPU of the main body 10. The CPU 100 loads an OS of the main body 10 to the RAM 102 and executes the OS, and executes various application programs corresponding to the OS as appropriate to demonstrate major image processing functions such as scanning and copying.

The ROM 101 is a nonvolatile memory that stores a fixed program, for example, a boot loader. The RAM 102 is a volatile memory used as a work area of the CPU 100. The HDD 103 is an auxiliary storage device that includes a recording disk, writes programs and data to the recording disk, and reads the programs and the data from the recording disk. The programs include executable programs such as a first OS and applications.

The communication I/F 104 is a communication interface that communicates with the operation panel 20. The communication interface conforms to, for example, a wireless scheme such as Bluetooth® but may conform to a communication scheme using a cable such as Universal Serial Bus (USB).

The coupling I/F 105 is an interface that communicates a signal such as a signal that switches between high and low with the operation panel 20 through the coupling cable 30. The coupling I/F 105, a coupling I/F 205, and the coupling cable 30 correspond to a signal communication unit.

The engine 106 is an engine that performs scanning with the image processing unit 10-1 and printing with the image forming unit 10-2.

The timer 107 counts to a set time.

The power supply controller 108 is a microcomputer that performs predetermined control at the time of rebooting. The power supply controller 108 may be referred to as a first power supply controller or first power supply control circuitry. The power supply controller 108 is constantly supplied with power from an external power supply or the like. A CPU (may be referred to as a sub CPU) of the microcomputer monitors a state of a signal at the coupling I/F 105 and performs control for rebooting when rebooting is desirable. When performing rebooting, the power supply controller 108 performs signal input/output control such as starting the timer 107 and a power ON/OFF operation of a power supply device 109. The power supply device 109 is a power supply device of the main body 10. The power supply device 109 starts supplying power to each of the components of the main body 10 in response to an ON operation, and stops supplying power in response to an OFF operation.

In this configuration, log information is stored in, but not limited to, the HDD 103. The main body 10 may include a nonvolatile memory such as a flash ROM, in which the log information may be stored.

The operation panel 20 includes a CPU 200, a ROM 201, a RAM 202, a flash ROM 203, a communication I/F 204, the coupling I/F 205, a touch panel 206, a liquid crystal display (LCD) 207, and a power supply controller 208. The CPU 200, the ROM 201, the RAM 202, the flash ROM 203, the communication I/F 204, the coupling I/F 205, the touch panel 206, the LCD 207, and the power supply controller 208 are coupled to one another through a bus 210.

The CPU 200 reads control programs stored in the ROM 201 or the flash ROM 203 to the RAM 202 and executes each of the control programs as appropriate. The CPU 200 is a main CPU of the operation panel 20. The CPU 200 loads an OS of the operation panel 20 to the RAM 202 and executes the OS, and executes various application programs corresponding to the OS as appropriate to demonstrate major operation setting processing functions.

The ROM 201 is a nonvolatile memory that stores a fixed program, for example, a boot loader. The RAM 202 is a volatile memory used as a work area of the CPU 200. The flash ROM 203 is a nonvolatile memory that stores a second OS such as Android® OS different from the first OS of the main body 10 and applications such as Android® applications that are run by the CPU 200 on the second OS.

The communication I/F 204 is a communication interface that communicates with the main body 10. The communication interface conforms to, for example, a wireless scheme such as Bluetooth® but may conform to a communication scheme using a cable such as USB.

The coupling I/F 205 is an interface that communicates a signal such as a signal that switches between high and low with the main body 10 through the coupling cable 30.

The touch panel 206 is an input device that detects a position of a touch on a screen of the LCD 207 and notifies the CPU 200 of information on the detected position. An input device including hardware keys or the like may be provided as an input device in addition to the touch panel 206.

The LCD 207 is a display device that includes a liquid crystal display screen and displays screen information, which is output to the LCD 207 by the CPU 200, on the liquid crystal display screen. The display device may be an organic electroluminescence (EL) display as well as the LCD.

The power supply controller 208 is a microcomputer that performs predetermined control at the time of rebooting. The power supply controller 208 may be referred to as a second power supply controller or second power supply control circuitry. The power supply controller 208 is constantly supplied with power, for example, through a power supply cable included in the coupling cable 30 when the main body 10 is coupled to the external power supply.

A CPU (may be referred to as a sub CPU) of the microcomputer of the power supply controller 208 monitors a signal at the coupling I/F 205 and performs control for rebooting. The power supply controller 208 powers on or off a power supply device 209 in conjunction with the rebooting control performed in the main body 10.

The power supply device 209 is a power supply device of the operation panel 20. In response to power-on of the power supply device 209, power supply to the components of the operation panel 20 is started. In response to power-off of the power supply device 209, the operation panel 20 is powered off.

Description of Functions

Figure 3:
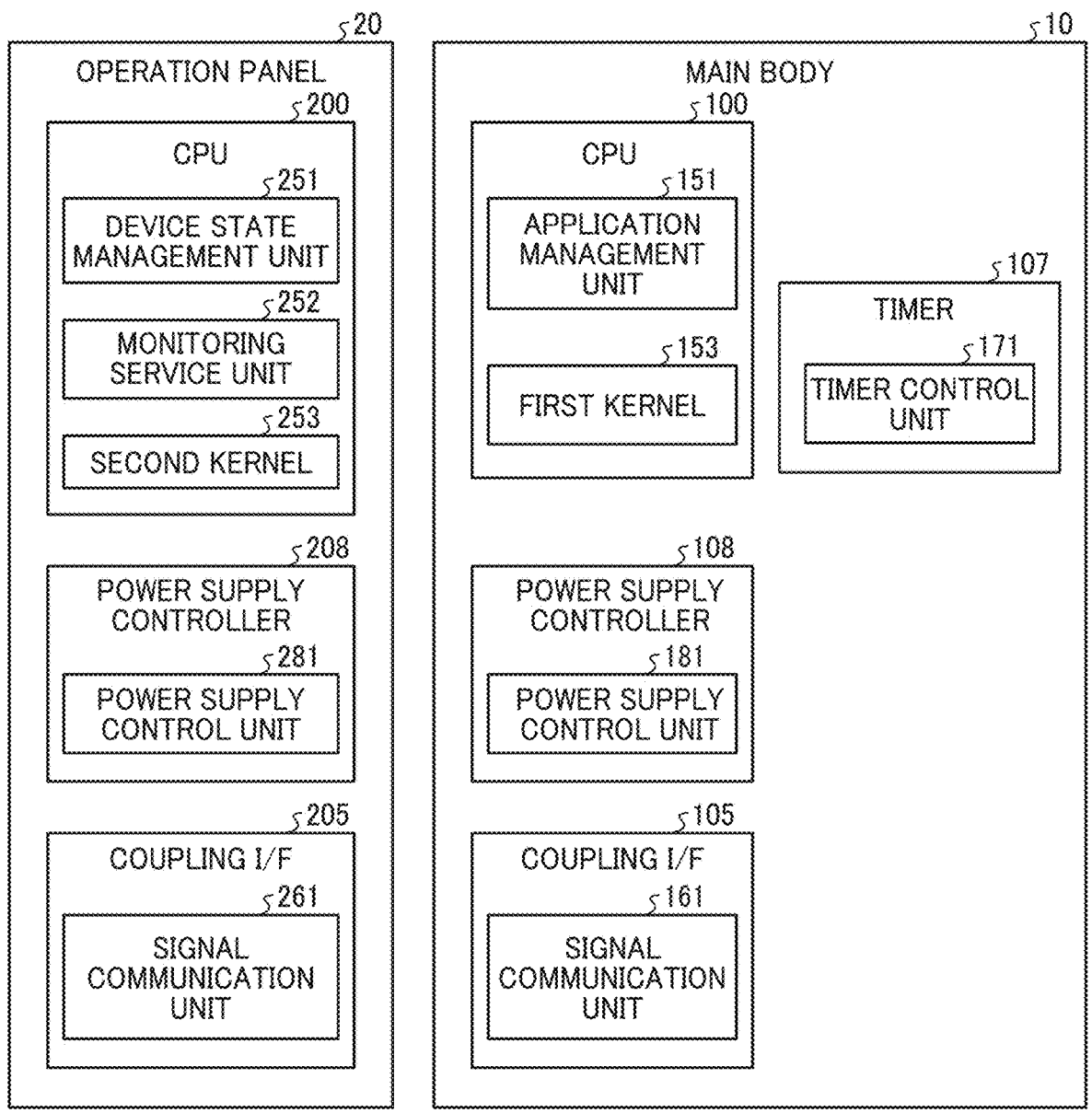
FIG. 3 is a diagram illustrating an example of functions of the MFP.

FIG. 3 is a diagram illustrating an example of functions of the MFP 1. In FIG. 3, the CPU 100 of the main body 10 includes an application management unit 151 and a first kernel 153 which is the first OS of the main body 10. The application management unit 151 and the first kernel 153 are an example of functions of the main body 10 related to rebooting control. In FIG. 3, the coupling I/F 105, the timer 107, and the power supply controller 108 respectively include a signal communication unit 161, a timer control unit 171, and a power supply control unit 181, which are an example of functional units of the main body 10 related to rebooting control.

The application management unit 151 communicates with each of the applications in the main body 10 and manages a processing state of each of the applications. The applications implement, for example, a scan function, a copy function, and a print function.

In the embodiment, in response to detection of an error in communication with an application of the operation panel 20 (for example, a predetermined communication failure error), the application management unit 151 restricts operations of the applications that are management targets. At this time, in response to a request for a time to be taken for processing (such as storage of log information and unmounting of the HDD 103) desirably performed prior to rebooting from any of the management-target applications, the application management unit 151 acquires information on the time and requests the first kernel 153 to extend the timer 107. The application completes processing such as storage of log information during the time. If a print application is performing printing, the application management unit 151 acquires information on a time to be taken for completing printing from the print application, includes the acquired information on the time in a request for timer extension, and sends the request to the first kernel 153. Thus, printing is successfully completed during that time unless no print error occurs during printing.

Based on the time set in the timer 107 and the time indicated by the information acquired by the application management unit 151, the first kernel 153 extends the timer 107 by a desirable amount of time. The first kernel 153 extends the timer 107 by an amount of time including a time to be taken for separating a device, for example, a time to be taken for unmounting the HDD 103. For example, if 30 more seconds is desired in addition to the set time, the first kernel 153 extends the timer 107 by 30 seconds. The first kernel 153 performs processing such as unmounting the HDD 103 in response to a reboot request.

The signal communication unit 161 communicates signals with a signal communication unit 261 of the operation panel 20.

For example, in response to receiving a signal indicating a communication failure error from the operation panel 20, the signal communication unit 161 notifies the power supply control unit 181 of the communication failure error. In response to an instruction from the power supply control unit 181, the signal communication unit 161 communicates various signals related to rebooting control to the signal communication unit 261 of the operation panel 20. A signal is communicated from a communication source to a communication destination in the following manner. For example, the communication source switches signal communication between ON and OFF, so that the signal for which the signal communication is switched ON is communicated from the communication source to the communication destination.

In response to a start request, the timer control unit 171 starts the timer 107 according to an initial setting set in advance and counts down (or up) the time. The timer control unit 171 may change the time set in the timer 107 to the value of the time included in the sent start request, and then start the timer 107. In the embodiment, the time set in the timer 107 may be a time (for example, 20 seconds) to be taken by the operation panel 20 to store log information. In response to receipt of a request for timer extension including information on a time by which the timer 107 is to be extended after the start of the timer 107, the timer control unit 171 extends the time set initially at the start by the time based on the information.

In response to the signal communication unit 161 receiving a signal indicating a communication failure error, the power supply control unit 181 sends a signal to the timer control unit 171 to start the timer 107 and sends a signal indicating detection of the communication failure error to the CPU 200. In response to a power-off request from the CPU 200 after the start of the timer 107, the power supply control unit 181 outputs a power-off instruction to the operation panel 20 and then powers off the power supply device 109. If counting by the timer 107 ends before the receipt of the power-off request, the power supply control unit 181 forcibly powers off the power supply device 109 in response to the end of counting. That is, if processing enters a loop because of a print error during printing, the power supply control unit 181 forcibly powers off the power supply device 109 and successfully ends the processing.

After the power-off, the power supply control unit 181 starts rebooting, and sends a rebooting start signal to the signal communication unit 261 of the operation panel 20.

In FIG. 3, the CPU 200 of the operation panel 20 includes a device state management unit 251, a monitoring service unit 252, and a second kernel 253 which is the second OS. The device state management unit 251, the monitoring service unit 252, and the second kernel 253 are an example of functions of the operation panel 20 related to rebooting control. In FIG. 3, the coupling I/F 205 and the power supply controller 208 respectively include the signal communication unit 261 and a power supply control unit 281, which are an example of functional units of the operation panel 20 related to rebooting control.

The device state management unit 251 manages a device state of the operation panel 20. For example, the device state management unit 251 also manages processing states of respective applications. The applications implement, for example, a scan function, a copy function, and a print function.

The monitoring service unit 252 communicates with the device state management unit 251 and monitors states of communication performed between the main body 10 and the respective applications. In response to detecting a communication failure for which rebooting is desirable, the monitoring service unit 252 notifies the second kernel 253 of an error number of the communication failure.

If there is a request for a wait time to be taken before restriction of operations of the applications, the monitoring service unit 252 may wait for that time and then notify the second kernel 253 of the error number. In the embodiment, the time set in the timer 107 of the main body 10 is a time (for example, 20 seconds) to be taken by the operation panel 20 to store log information. Thus, even if the monitoring service unit 252 notifies the second kernel 253 of the error number without waiting for the wait time, the log information is successfully stored. If the monitoring service unit 252 waits for the wait time, the monitoring service unit 252 notifies the second kernel 253 of the error number in response to the wait time exceeding an upper-limit time set in advance.

In response to being notified of the error number by the monitoring service unit 252, the second kernel 253 sends a signal indicating the communication failure error corresponding to the error number to the signal communication unit 161 of the main body 10 via the signal communication unit 261. In response to completion of storage of the log information, the second kernel 253 prepares for shutdown.

The signal communication unit 261 communicates signals with the signal communication unit 161 of the main body 10. The signal communication unit 261 communicates a signal indicating a communication failure error and various signals related to rebooting to the main body 10. As described above, a signal is communicated from a communication source to a communication destination in the following manner. The communication source switches signal communication between ON and OFF, so that the signal for which the signal communication is switched ON is communicated from the communication source to the communication destination.

In response to the signal communication unit 261 receiving a power-off signal from the main body 10, the power supply control unit 281 powers off the operation panel 20. In response to the signal communication unit 261 receiving a rebooting start signal from the main body 10, the power supply control unit 281 powers on the operation panel 20 to start rebooting the operation panel 20.

Sequence

Figure 4:
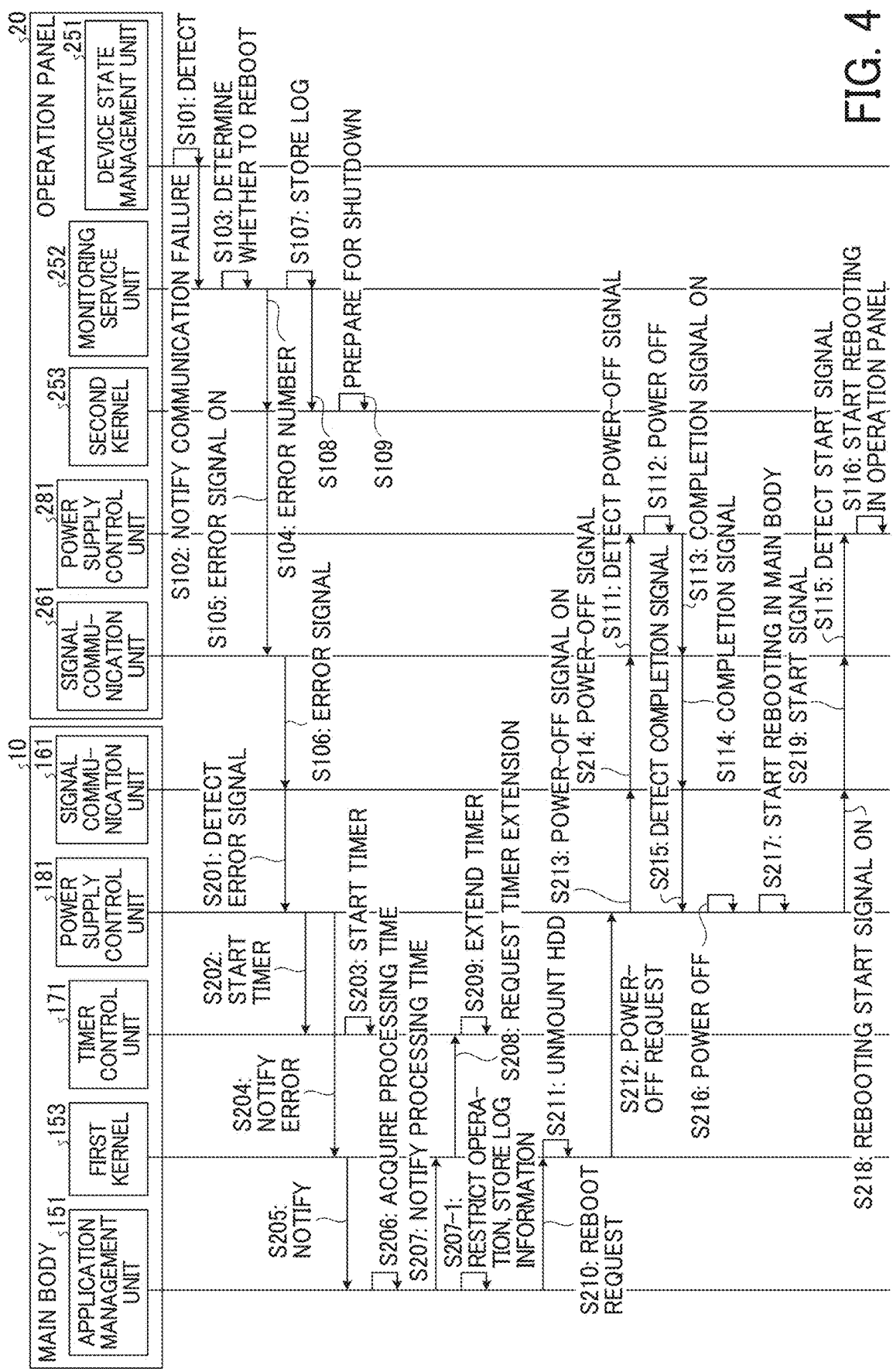
FIG. 4 is a sequence diagram of an example of a rebooting process performed between a main body and an operation panel of the MFP.

FIG. 4 is a sequence diagram of an example of a rebooting process performed between the main body 10 and the operation panel 20 of the MFP 1. In response to occurrence of a communication failure between the main body 10 and the operation panel 20, the device state management unit 251 of the operation panel 20 detects the communication failure (S101) and notifies of the monitoring service unit 252 of the communication failure (S102).

The monitoring service unit 252 determines whether rebooting is desirable based on details of the communication failure (S103). If rebooting is desirable for the communication failure, the monitoring service unit 252 notifies the second kernel 253 of an error number of a corresponding communication failure error (S104).

The second kernel 253 switches the state of an error signal ON at the signal communication unit 261 (S105), so that the error signal is communicated from the signal communication unit 261 of the operation panel 20 to the signal communication unit 161 of the main body 10 (S106).

In response to the communication of the error signal to the signal communication unit 161 of the main body 10, the power supply control unit 181 detects the error signal (S201) and sends a timer start signal to the timer control unit 171 (S202). In response to the timer start signal, the timer control unit 171 causes the timer 107 to start counting down (or up) (S203).

Along with the sending of the timer start signal to the timer control unit 171, the power supply control unit 181 notifies the first kernel 153 of the error (S204).

In response to being notified of the error, the first kernel 153 notifies the application management unit 151 of the error (S205). The application management unit 151 acquires a processing time to be taken for processing desirably performed prior to rebooting from each application (S206) and notifies the first kernel 153 of the acquired processing time (S207).

In response to being notified of the processing time by the application management unit 151, the first kernel 153 sends a request for timer extension to the timer control unit 171 (S208).

Based on the request for timer extension from the first kernel 153, the timer control unit 171 extends the time set in advance in the timer 107 (S209). The extension time may be set as appropriate, for example, to 30 seconds. The time set in the timer 107 after the extension is a time, including the extension time, to be taken by the main body 10 to finish storing the log information and finish unmounting the HDD 103. If the main body 10 is performing printing, a print application requests a time. Thus, the time set in the timer 107 after the extension includes a time to be taken for completing printing.

After notifying the first kernel 153 of the processing time (S207), the application management unit 151 waits for the time requested by the application and then restricts operation of the application (S207-1). During this wait time, desirable processing such as storage of log information is performed in the main body 10.

After restricting the operation, the application management unit 151 sends a reboot request to the first kernel 153 (S210).

In response to the reboot request, the first kernel 153 sets each device so that no issue is caused by power-off (S211). For example, the first kernel 153 unmounts the HDD 103 so that no issue is caused by power-off. The first kernel 153 then sends a power-off request to the power supply control unit 181 (S212).

If a print error occurs during printing, printing is not successfully completed within the extended time set in the timer 107. Thus, the power supply control unit 181 uses timeout of the timer 107 as a trigger for power-off.

In response to the power-off request, the power supply control unit 181 switches the power-off signal ON at the signal communication unit 161 (S213), so that the power-off signal is communicated to the signal communication unit 261 of the operation panel 20 (S214).

In response to the communication of the power-off signal to the signal communication unit 261, the power supply control unit 281 of the operation panel 20 detects the power-off signal (S111) and powers off the operation panel 20 (S112).

After the completion of power-off, the power supply control unit 281 switches a completion signal ON at the signal communication unit 261 (S113), so that the completion signal is communicated to the signal communication unit 161 of the main body 10 (S114).

In response to the communication of the completion signal to the signal communication unit 161, the power supply control unit 181 of the main body 10 detects the completion signal (S215) and powers off the main body 10 (S216).

After the power-off, the power supply control unit 181 of the main body 10 starts rebooting (S217). The rebooting procedure performed after the power-on is the same as the procedure of the related art. Thus, the detailed description is omitted herein.

After the start of the rebooting, the power supply control unit 181 switches a start signal, which indicates rebooting has been started, ON at the signal communication unit 161 (S218), so that the start signal is communicated to the signal communication unit 261 of the operation panel 20 (S219).

The power supply control unit 281 of the operation panel 20 detects the communication of the start signal to the signal communication unit 261 (S115), and in response to the detection, starts rebooting in the operation panel 20 (S116). The rebooting procedure performed after the power-on is the same as the procedure of the related art. Thus, the detailed description is omitted herein.

In the embodiment, the main body 10 includes the timer 107 for power-off. If a communication failure with the operation panel 20 occurs, a time desired for processing desirably performed prior to rebooting, for example, a time desired for processing such as log processing or unmounting the HDD 103 is added to the time set in the timer 107 as appropriate to extend the time to elapse before the time is up. The power supply is forcibly stopped in response to the time set in the timer 107 being up. However, extension of the time to elapse before the time is up enables processing desirably performed prior to rebooting such as storage of a log or unmounting of the HDD 103 to be completed. Consequently, a success rate of rebooting increases.

As described above, rebooting processing is performed after software is ready for power-off. This enables a log of an abnormality that has occurred to be stored and enables a damage of a device such as an HDD to be avoided. Thus, both the reliability and the certainty of rebooting are successfully attained.

The program executed by the rebooting system according to the embodiment may be provided after being preinstalled in a ROM. Alternatively, the program may be provided after being stored on a computer-readable recording medium, such as a compact disc-read only memory (CD-ROM), a flexible disk (FD), a compact disc-recordable (CD-R), or a digital versatile disc (DVD), as a file of an installable or executable format. The program may be provided after being stored in a computer connected to a network such as the Internet and is downloaded via the network.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

This patent application is based on and claims priority to Japanese Patent Application No. 2021-190308, filed on Nov. 24, 2021, in the Japan Patent Office, the entire disclosure of which is hereby incorporated by reference herein.

Reference Signs List

1 MFP
10 main body
20 operation panel
30 coupling cable
100 CPU
101 ROM
102 RAM
103 HDD
104 communication I/F
105 coupling I/F
106 engine
107 timer
108 power supply controller
109 power supply device
151 application management unit
153 first kernel
161 signal communication unit
171 timer control unit
181 power supply control unit
200 CPU
201 ROM
202 RAM
203 flash ROM
204 communication I/F
205 coupling I/F
206 touch panel
207 LCD
208 power supply controller
209 power supply device
251 device state management unit
252 monitoring service unit
253 second kernel
261 signal communication unit
281 power supply control unit

The invention claimed is:

1. A rebooting system comprising:
a processing apparatus configured to perform processing;
an operation panel configured to receive at least one operation associated with the processing apparatus;
a multi-function printer including a main body and the operation panel, the main body including the processing apparatus,
the processing apparatus including,
    first power supply control circuitry configured to control power supply in the processing apparatus,
    a timer,
    first processing circuitry, and
    a first communication interface configured to communicate with the operation panel, and
the operation panel including,
    second power supply control circuitry configured to control power supply in the operation panel, and
    a second communication interface configured to communicate with the processing apparatus, wherein
in response to receipt of a communication error signal indicating a communication error between the operation panel and the processing apparatus, the first power supply control circuitry is further configured to start the timer for a first desired period of time and notify the first processing circuitry of the communication error,
the first processing circuitry is further configured to transmit a request to the timer to extend the first desired period of time by an extension period of time, the extension period of time set based on a time to be taken for processing performed by the processing apparatus and an initial time set by the timer,
in response to receipt of a first power-off signal from the second power supply control circuitry, the first power supply control circuitry is further configured to power off the processing apparatus and to start a rebooting operation,
in response to the extended first desired period of time expiring before the receipt of the first power-off signal from the second power supply control circuitry, the first power supply control circuitry is further configured to forcibly power off the processing apparatus, and
the timer is configured to set, as the extended first desired period of time, a sum of at least the initial time set by the timer, a time to be taken by the processing apparatus to store log information, and a time to be taken by the processing apparatus to unmount a hard disk drive.

2. The rebooting system according to claim 1, wherein in response to a power-off request from the first processing circuitry, the first power supply control circuitry is further configured to sends a second power-off signal to the second power supply control circuitry, the second power-off signal requesting power-off of the operation panel.

3. The rebooting system according to claim 1, wherein the main body is configured to be coupled to the operation panel via a coupling cable.

4. The rebooting system according to claim 1, wherein the operation panel includes a display device configured to receive user inputs regarding at least one setting for at least one function of the multi-function printer from a user.

5. The rebooting system according to claim 1, wherein
the processing apparatus includes a first power supply;
the first power supply control circuitry is further configured to control the first power supply;
the operation panel includes a second power supply; and
the second power supply control circuitry is further configured to control the second power supply.

6. The rebooting system according to claim 1, wherein the initial time set by the timer corresponds to a time to be taken by the operation panel to store the log information.

7. A rebooting method carried out by a computer system including a multi-function printer, the multi-function printer including a main body and an operation panel, the main body including a processing apparatus including a timer, first processing circuitry, and first power supply control circuitry, and the operation panel including second power supply control circuitry, the rebooting method comprising:
in the first power supply control circuitry, starting the timer for a first desired period of time in response to receipt of a communication error signal indicating a communication error between the operation panel and the processing apparatus;

in the first processing circuitry, requesting the timer to extend the first desired period of time by an extension period of time, the extension period of time set based on a time to be taken for processing performed by the processing apparatus and an initial time set by the timer; and in the first power supply control circuitry, in response to the extended first desired period of time expiring before the receipt of a first power-off signal for starting a rebooting operation from the second power supply control circuitry, forcibly powering off the processing apparatus, wherein in the first power supply control circuitry, setting as the extended first desired period of time, a sum of at least the initial time set by the timer, a time to be taken by the processing apparatus to store log information, and a time to be taken by the processing apparatus to unmount a hard disk drive, in the timer.

8. A non-transitory computer recordable medium including computer readable code, which when executed by a computer system, causes the computer system to perform the method of claim 7.

9. The rebooting method according to claim 7, wherein in response to a power-off request from the first processing circuitry:

in the first power supply control circuitry, sending a second power-off signal to the second power supply control circuitry, the second power-off signal requesting power-off of the operation panel.

10. The rebooting method according to claim 7, wherein the main body is coupled to the operation panel via a coupling cable.

11. The rebooting method according to claim 7, wherein the operation panel includes a display device and second processing circuitry; and the method further includes, in the second processing circuitry, receiving user inputs regarding at least one setting for at least one function of the multi-function printer from a user via the display device.

12. The rebooting method according to claim 7, wherein the processing apparatus includes a first power supply; the operation panel includes a second power supply; and the method further includes, in the first power supply control circuitry, controlling the first power supply, and in the second power supply control circuitry, controlling the second power supply.

13. The rebooting method according to claim 7, wherein the initial time set by the timer corresponds to a time to be taken by the operation panel to store the log information.

14. A multi-function printer comprising:

a processing apparatus configured to perform at least one image processing function;

a first power supply configured to provide power to the processing apparatus, the first power supply included in the processing apparatus;

an operation panel configured to receive at least one operation associated with the processing apparatus; and a second power supply configured to provide power to the operation panel, the second power supply included in the operation panel, the processing apparatus including,
    first power supply control circuitry configured to control the first power supply in the processing apparatus,
    a timer,
    first processing circuitry, and
    a first communication interface configured to communicate with the operation panel, and the operation panel including,
    second power supply control circuitry configured to control the second power supply in the operation panel, and
    a second communication interface configured to communicate with the processing apparatus, wherein in response to receipt of a communication error signal indicating a communication error between the operation panel and the processing apparatus, the first power supply control circuitry is further configured to start the timer for a first desired period of time and notify the first processing circuitry of the communication error, the first processing circuitry is further configured to transmit a request to the timer to extend the first desired period of time by an extension period of time, the extension period of time set based on a time to be taken for processing performed by the processing apparatus, in response to receipt of a first power-off signal from the second power supply control circuitry, the first power supply control circuitry is further configured to power off the processing apparatus and to start a rebooting operation, the timer is configured to,
    set, as the extended first desired period of time, a sum of at least an initially set time to be taken by the operation panel to store log information, a time to be taken by the processing apparatus to store the log information, and a time to be taken by the processing apparatus to unmount a hard disk drive, and in the first power supply control circuitry, in response to the extended first desired period of time expiring before the receipt of the first power-off signal from the second power supply control circuitry, forcibly powering off the processing apparatus.

* * * * *